(12) United States Patent
Volohovs

(10) Patent No.: US 11,807,504 B2
(45) Date of Patent: Nov. 7, 2023

(54) WINCH

(71) Applicant: Dmitrijs Volohovs, Riga (LV)

(72) Inventor: Dmitrijs Volohovs, Riga (LV)

( * ) Notice: Subject to any disclaimer, the term of this patent is extended or adjusted under 35 U.S.C. 154(b) by 169 days.

(21) Appl. No.: 17/392,648

(22) Filed: Aug. 3, 2021

(65) Prior Publication Data

US 2022/0055874 A1 Feb. 24, 2022

(30) Foreign Application Priority Data

Aug. 18, 2020 (EP) .................................... 20191541

(51) Int. Cl.
*B66D 1/00* (2006.01)
*B66D 1/36* (2006.01)
*B66D 1/12* (2006.01)

(52) U.S. Cl.
CPC ................. *B66D 1/36* (2013.01); *B66D 1/12* (2013.01); *B66D 2700/0191* (2013.01)

(58) Field of Classification Search
CPC . B66D 1/36; B66D 12/60; B66D 3/20; B66D 3/26; B66D 2700/0191; H02G 11/02
See application file for complete search history.

(56) References Cited

U.S. PATENT DOCUMENTS

| | | | |
|---|---|---|---|
| 3,773,987 A | 11/1973 | Davis et al. | |
| 5,094,396 A | 3/1992 | Burke | |
| 5,382,172 A | 1/1995 | Klier et al. | |
| 2014/0263801 A1 | 9/2014 | Skowronski | |
| 2016/0012941 A1* | 1/2016 | Ledwith | H02G 11/02 156/280 |

FOREIGN PATENT DOCUMENTS

| | | | | |
|---|---|---|---|---|
| DE | 4124410 A1 * | 1/1993 | ............. | H02G 11/02 |
| EP | 2506378 A1 * | 10/2012 | .......... | B60L 11/1818 |
| EP | 3582353 A1 | 12/2019 | | |

OTHER PUBLICATIONS

EP Office Action in co-pending application EP 2019154.0, dated Feb. 11, 2021.

* cited by examiner

*Primary Examiner* — Emmanuel M Marcelo
(74) *Attorney, Agent, or Firm* — Hayes Soloway PC

(57) ABSTRACT

A winch includes a first electrically conductive cable for transferring electrical power and/or electrical data signals where the first electrically conductive cable is in the form of a spiral, a fixation unit coupled to a first portion of the first electrically conductive cable and configured to fix in place the first portion of the first electrically conductive cable, and a first support member coupled to a second portion of the first electrically conductive cable where the first portion and the second portion are different from each other, where the first support member is coupleable to a winch drum and is rotatable, together with the second portion of the first electrically conductive cable, with the winch drum in a rotational direction around an axis of rotation of the winch drum while the first portion of the first electrically conductive cable is fixed in place during the rotation of the winch drum.

13 Claims, 10 Drawing Sheets

WINCH

BACKGROUND OF THE INVENTION

1. Field of the Invention

The present invention relates generally to a winch having a first electrically conductive cable, a fixation unit, and a first support member, where the first electrically conductive cable carries electrical power and/or electrical data signals to the first support member.

2. Description of the Prior Art

A spiral cable box is described, for example, in U.S. Pat. No. 5,382,172 A, which generally relates to a box for taking up and installing a spiral cable.

The spiral cable box of U.S. Pat. No. 5,382,172 A comprises a lower box part and an upper box part to encase a spiral cable. The box also comprises openings to allow the cable to be fed into, out of, and through the box as the cable is wound and unwound. These openings also create angular end areas which are aligned in parallel to the box to create an electrical connection.

As the cable passes through the openings of the box during the winding and unwinding process, the cable is repeatedly bent as it travels through the openings, which can lead to cracks and eventually breaks in the cable over time. This may result in high maintenance costs.

The spiral cable box can also create excess (e.g. clattering) noise pollution as the cable not only passes over itself as it is wound and unwound, but also impacts against the surfaces of the box. This can be a problem if there are many spiral cable boxes working in the same location or in an enclosed space.

This type of box may also lead to the cable not being wound in a substantially radial direction, i.e. there is axial displacement in the coils of the cable that are laid over the top of each other. This may reduce the lifespan of the cable as the coils can slip over each other, thereby causing extra friction wear.

In the field of lighting, a winch may use an electrical slip ring to transmit electrical power and/or electrical data signals. These slip rings, however, wear quickly due to friction between the stator and the rotor of the winch, meaning higher maintenance costs and lower quality signals. This can lead to high electrical noise and reduced reliability.

Further prior art can be found in U.S. Pat. No. 5,094,396 A which generally relates to a retractable reel assembly for telephone extension cord and WO 00/31847 A1 which generally relates to a miniature retractable cord reel.

In view of the above, there is therefore a need for improvement in the field of winches, in particular in which noise is reduced or eliminated, wear of parts is reduced or eliminated, and construction is simple.

SUMMARY OF THE INVENTION

The invention is set out in the independent claim. Preferred embodiments of the invention are outlined in the dependent claims.

We describe a winch comprising a first electrically conductive cable for transferring electrical power and/or electrical data signals, wherein the first electrically conductive cable is in the form of a spiral. The winch further comprises a fixation unit coupled to a first portion of the first electrically conductive cable and configured to fix in place the first portion of the first electrically conductive cable. The winch further comprises a first support member coupled to a second portion of the first electrically conductive cable, wherein the first portion and the second portion of the first electrically conductive cable are different from each other. The first support member is coupleable to a winch drum and is rotatable, together with the second portion of the first electrically conductive cable, with a said winch drum in a rotational direction around an axis of rotation of the winch drum while the first portion of the first electrically conductive cable is fixed in place during a said rotation.

The fixation unit may ensure that the first electrically conductive cable cannot travel freely through the winch. This means that the first portion of the first electrically conductive cable may be fixed in place if the cable is coupled to a connector located on one or more frame portions of the winch and/or during the winding and unwinding processes of the winch. This means that, when the second portion of the first electrically conductive cable is going through the winding and/or unwinding process, the second portion may not need to go through an angular change in direction during the winding and/or unwinding processes. This may reduce wear on the first electrically conductive cable, thus increasing the lifespan of the first electrically conductive cable and reducing maintenance costs.

The first support member being coupleable to a winch drum and rotating with said winch drum may allow for a stable transfer of electrical power and/or electrical data signals. In some examples, this transferal is from a connector, which may be located on a frame portion of the winch, to the first support member at any point of the winding and/or unwinding process via the first electrically conductive cable. In some examples, the electrical power and/or electrical data signals may be further transferred to a load which is coupleable to a second electrically conductive cable.

Being wound or being in a wound state may be defined throughout the present disclosure as when there is little to no slack in the first electrically conductive cable (and/or the second electrically conductive cable, as will be outlined below) is coiled around the winch drum.

Being unwound or being in an unwound state may be defined throughout the present disclosure as when there is (for example a certain amount of) slack in the first electrically conductive cable and/or a load (which may, in some examples, be a lighting device, such as an LED or LED bulb) and/or the second electrically conductive cable, so that the first electrically conductive cable and/or the load and/or the second electrically conductive cable is not coiled around the drum.

The second electrically conductive cable may be comprised in a rope of the winch. In some examples, the rope may be constituted of the second electrically conductive cable.

The winding process may be defined throughout the present disclosure as the process of the first electrically conductive cable moving from an unwound position to a wound position.

The unwinding process may be defined throughout the present disclosure as the process of the first electrically conductive cable moving from a wound position to an unwound position.

The axial direction may be defined throughout the present disclosure as a straight line extending from the center point of the drum and through both frame portions of the winch on either side of the drum.

The radial direction may be defined throughout the present disclosure as a straight line perpendicular to the axial direction, for example, extending from the center point of the drum to the first support member.

The first portion of the first electrically conductive cable may be defined throughout the present disclosure as the portion of the first electrically conductive cable that may be fixed to or be enclosed within the fixation unit.

The second portion of the first electrically conductive cable may be defined throughout the present disclosure as the portion of the cable which is wound and unwound between the fixation unit and the first support member.

The first portion of the first electrically conductive cable may, in some examples, relate to a first end portion of the first electrically conductive cable. Additionally or alternatively, the second portion of the first electrically conductive cable may, in some examples, relate to a second end portion of the first electrically conductive cable. The first end portion may be opposite to the second end portion.

In some examples, the drum is rotated by the motor of the winch.

In some examples, the first electrically conductive cable comprises contact pads at both end portions of the first electrically conductive cable. The ends of the first electrically conductive cable may be inserted into connectors which may be suitable for flexible cables. One end may be inserted into a connector on a frame portion of a frame (which may comprise a PCB with control electronics) of the winch.

The first electrically conductive cable of the winch is in the form of a spiral. This may increase axial stability of the first electrically conductive cable and reduce axial displacement between the windings of the first electrically conductive cable.

A reduction in axial displacement may result in a reduction in the twisting of the second portion of the first electrically conductive cable. This may lead to fewer cracks and breaks in the cable, thus increasing the lifespan of the first electrically conductive cable. It may also lead to less friction wear between windings of the first electrically conductive cable as the windings may have a reduced chance of sliding across one another and impact against surfaces of the winch. This reduction in axial displacement may also lead to a reduction in noise pollution as the windings may have a reduced chance of sliding over one another and a reduced chance of impacting the surfaces of the winch.

In some examples of the winch, the second portion of the first electrically conductive cable comprises or forms a limiting element configured to limit movement of the second portion of the first electrically conductive cable in a radial direction around the axis of rotation of the winch drum. The limiting element may be formed by connecting two portions of the second portion of the second cable to each other. This connection may be formed by a glue or any other suitable means. The limiting element may protect the flat electrically conductive cable from excess radial expansion during the unwinding process and thus, increase the lifespan of the flat electrically conductive cable. It can also act as an additional mechanical support for the flat electrically conductive cable. This limiting element is preferably circular but can be any shape suitable for limiting the radial expansion of the flat electrically conductive cable.

In some examples, the winch further comprises a second support member coupleable via the first electrically conductive cable to the fixation unit. This second support member may allow for a more robust construction of the spiral cable unit and a reduction in the axial and/or radial and/or rotational displacements of the first electrically conductive cable. This may lead to improved transferal of electrical power and/or electrical data signals and a longer lifespan of the cable.

In some examples of the winch, the second support member further comprises a slot, wherein the second portion of the first electrically conductive cable is fixed in place in the slot. This may result in a particularly strong fixing of the cable and a reduction in the axial and/or radial and/or rotational movements of the first cable during the winding and unwinding processes, thereby leading to a longer lifespan of the cable. The cable may be fixed by a glue or any other suitable means.

In some examples of the winch, the second support member further comprises a limiting member extending in a substantially radial direction towards the fixation unit, wherein the limiting member is configured to limit movement of the second portion of the first electrically conductive cable in an axial direction along the axis of rotation of the winch drum.

The limiting member may arrest axial displacement of the windings of the first electronically conductive cable as they are wound and unwound and may reduce friction wear between the windings, thus increasing the lifespan of the cable.

In some examples, the fixation unit is located in a central region of the winch and the second support member is located in an off-central region of the winch. In some examples, the fixation unit is located in a central region of the winch drum and the second support member is located in an off-central region of the winch drum.

In some examples, there are two limiting members coupled to the second support member. This may reduce the axial displacement of each winding, reducing the friction wear of each winding as they slide over each other, thus increasing lifespan of the first electrically conductive cable. The number of limiting members is not restricted to two and may be any number suitable for the applications of the winch.

In some further examples of the winch, the limiting member further comprises a limiting member opening configured to accommodate the fixation unit. The opening may be configured to (also) accommodate a support member at the center of the spiral cable unit. The opening may prevent the windings of the flat electrically conductive cable from being caught between the limiting members and the surface of the fixation unit during the winding and/or unwinding processes leading to a more efficient winch and fewer mechanical failures. Additionally, the opening may allow for an easy to assemble spiral cable unit. The opening is preferably circular but can be of any shape that can accommodate the support member and/or the fixation unit at the center of the spiral cable unit.

In some examples of the winch, a radial gap between the fixation unit and the second support member fulfils $H \geq d + 2nt$, where d is a diameter of the limiting element, n is a number of windings of the second portion of the first electrically conductive cable and t is a radial thickness of a single winding of the first electrically conductive cable. This may allow for a radial gap which reduces the amount of friction each winding undergoes as the windings are not impacting an additional surface. This may result in a flat electrically conductive cable with a longer lifetime and a reduction in noise during operation of the winch.

In some examples of the winch, the second support member comprises two limiting members, wherein an axial gap between the two limiting members fulfills W>1.5 c, where c is an axial thickness of the second portion of the first electrically conductive cable. In some further examples, the axial gap additionally fulfills 2 c>W.

This axial gap may help keep the windings of the first electrically conductive cable in a substantially radial direction and may help keep the first electrically conductive cable bunched as the first electrically conductive cable winds and unwinds. This may lead to a reduction in axial displacement of each winding when compared to the other windings. This may in turn help reduce friction wear, increase the lifespan of the first electrically conductive cable, and reduce noise pollution.

If the axial gap is less than 2 times the axial thickness of the cable, the windings of the cable may be prevented from falling into a side-by-side position. If the windings were side-by-side, the result may be an increase in friction wear, a reduction in lifespan and an increase in noise pollution.

In some examples of the winch, the axial width of the fixation unit opening, the axial width of the second support member slot and the axial thickness of the second portion of the first electrically conductive cable (which may be a flat cable) are identical or substantially equal. This may prevent excess axial movements of the first electrically conductive cable and increase the axial stability of the windings of the first electrically conductive cable. It may also prevent unwanted axial displacement(s) of the windings of the first electrically conductive cable while the first electrically conductive cable is stationary and/or when the electrically conductive cable is undergoing the winding/unwinding process.

In some examples of the winch, the fixation unit opening and the second support member slot are in parallel or substantially in parallel with an axial direction along the axis of rotation of the winch drum. This may prevent the first electrically conductive cable from moving in the axial direction during the winding and/or unwinding processes and thus, improve axial stability of the first electrically conductive cable. It may also prevent the first electrically conductive cable from undergoing unwanted angular changes of direction during the winding and/or unwinding processes. This may result in a longer lifespan of the first electrically conductive cable and reduced maintenance costs.

In some examples of the winch, the first electrically conductive cable is at least partially lubricated and/or wherein a lubrication layer is arranged on at least a portion of the first electrically conductive cable.

In some examples, the first electrically conductive cable is at least partially (in some examples completely) lubricated and/or one or more lubrication/anti-friction layers may be arranged in between different windings of the first electrically conductive cable (for example on at least a portion (or all of) one or more of the windings of the first electrically conductive cable). The lubrication layer may be fixed on one side to a said winding and comprise a lubricant on the other side of the lubrication layer only which faces another winding of the first electrically conductive cable. Alternatively, the lubrication layer may comprise lubricating components on both sides of the lubrication layer.

Providing a lubrication layer and/or lubricating, the winding(s) may allow for a reduced axial displacement and a reduced radial displacement between the windings of the first electrically conductive cable. This may result in reduced wear of the windings and reduced noise pollution as they may not slide over each other (or reduce friction when they slide over each other in some instances) or impact any other part of the winch when the first electrically conductive cable is being wound and/or unwound. The lubrication and/or said anti-friction layer may be or comprise an oil and/or a synthetic lubrication and/or any other means of lubrication. The lubrication may, in some examples, be applied only once as the first electrically conductive cable is coupled to the winch or the lubrication may be applied periodically as part of a maintenance schedule.

In some examples, a large force may be required to draw apart two windings holding a lubrication/anti-friction layer between them, in both axial and radial directions. Thus, such a layer may keep windings of the first electrically conductive cable aligned with respect to each other. The windings may thus be held together.

In some examples of the winch, the winch further comprises a connector coupled to the second portion of the first electrically conductive cable and configured to couple the first electrically conductive cable to a second electrically conductive cable, wherein said second electrically conductive cable is configured to transfer electrical power and/or electrical data signals to a load coupleable to the second electrically conductive cable. This may allow for a secure connection between the two electrically conductive cables, thereby improving the stability of the electrical power and/or electrical data signals transferred to and/or from the load and for a secure spiral cable unit structure.

In some further examples, the connector and the second portion of the first electrically conductive cable each comprise an electrical contact configured to transfer electrical power and/or electrical data signals to one another. The contacts may be configured to mate with each other in order to create a stable connection. A stable connection may lead to an increase in the reliability of the transferal of electrical power and/or electrical data signals.

In some examples of the winch, the first support member is coupleable to a second electrically conductive cable and configured to direct a load coupleable to the second electrically conductive cable in a direction substantially equal to the direction of gravity during the rotation of the said winch drum. The second electrically conductive cable and the load may be the same second electrically conductive cable and load as the earlier mentioned second electrically conductive cable and load. This may allow for reduced flexing of the second electrically conductive cable resulting in a longer lifetime. It may also result in a more stable transferal of electrical power and/or electrical data signals along the second electrically conductive cable.

In some examples of the winch, the winch further comprises a third support member coupled to the fixation unit and configured such that the first portion of the first electrically conductive cable is secured between the third support member and the fixation unit. In some examples, there is an unwound section of the first portion secured between the third support member and the fixation unit. Alternatively, there may be a partial winding or one or more windings of the first portion secured between the third support member and the fixation unit. This may allow for a more secure fixing of the first portion of the first electrically conductive cable and a reduction in the angular changes of direction of the first portion of the cable. This may result in less wear and thus a longer lifespan and a reduction in maintenance costs.

In some examples, the fixation unit comprises a fixation unit opening, wherein the fixation unit opening is configured to allow the first electrically conductive cable to be fed through said fixation unit opening. The opening may allow the first electrically conductive cable to exit the fixation unit while still securing the first electrically conductive cable in place. As a result, it may not allow the moving part of the cable to go through any angular changes of direction. This in turn may lead to less wear on the cable, a longer lifespan and lower maintenance costs.

In some examples, the third support member and/or the fixation unit is rotatable by the motor of the winch. This may allow for the first electrically conductive cable to be wound and unwound. In some examples, the third support member and/or the fixation unit is rotatable by the winch drum.

In some further examples of the winch, the second support member, the third support member and an axis of rotation of the winch drum are arranged in parallel or substantially in parallel. In some examples, the second support member, the third support member and an axis of rotation of the winch drum and additionally arranged in parallel or substantially in parallel in relation to a ground plane. This may allow for a more secure fixing of the first electrically conductive cable and a reduction in the axial displacement of the cable during the winding and unwinding processes. This may in turn lead to a longer lifespan of the cable as there is less friction wear.

In some examples of the winch, the first support member further comprises a first support member opening configured to allow a second electrically conductive cable to pass through the first support member. The second electrically conductive cable may be the same second electrically conductive cable as the earlier mentioned second electrically conductive cable. This may allow for a secure fixing of the second electrically conductive cable as the cable may be fixed in place within the support member by a screw or any other suitable means. This may result in a reduction in the angular changes of direction said cable goes through and therefore, a reduction in wear. As a result, the lifespan of the cable may be increased.

In some examples of the winch, the winch further comprises a support frame configured to accommodate the first electrically conductive cable, the fixation unit and the first support member, wherein the support frame comprises a support frame opening configured to limit movement of a second support member and/or a third support member in an axial direction and a radial direction in relation to the axis of rotation of the winch drum. The support frame may allow for the spiral cable unit to be contained and to be protected against outside interference. It may also allow for easy repositioning of the winch should it need to be moved between locations. The support frame may allow for additional support of one or more features of the winch. The support frame and/or the support frame opening may allow for extra reinforcement or for increased stability of fixings should features need to be fixed in place.

In some examples, the second and third support members may be the same second and third support members as in earlier mentioned examples.

In some further examples of the winch, the support frame opening is configured to be parallel in a substantially axial direction in relation to the axis of rotation of the winch drum. This may allow for more secure fixings of features that are in the axial direction in relation to the axis of rotation of the winch drum. In particular, it may increase the stability of the second and third support members.

Alternatively, the opening may be a support portion opening, wherein the support frame comprises an additional support portion comprising said opening. The support portion of the frame may allow for additional support of one or more features of the winch. The support portion and/or the opening may allow for extra reinforcement or for increased stability of fixings should features need to be fixed in place.

In some further examples, both the frame portion and the support portion have openings.

In some examples, the fixation unit, the third support member, and the first portion of the first electrically conductive cable are integral to each other. This may give the first portion of the first cable a particularly strong fixing, increasing the chance of stable signal transfer.

In some examples, the fixation unit, the third support member, and the first portion of the first electrically conductive cable are not integral and manufactured separately to one another. This may allow for easier maintenance of the first electrically conductive cable, or unit comprising the first electrically conductive cable, the fixation unit and the first support member.

In some examples, the third support member may be the same third support member as in earlier mentioned examples.

In some examples, the first electrically conductive cable comprises a flexible printed circuit (FPC) and/or a flexible PCB. This may allow for the first electrically conductive cable to carry electrical power and/or electrical data signals from the connector located on the electrical signal transfer unit to the connector located on the frame as the cable is wound and/or unwound, creating the ability for the circuit to be completed and the signals to be transferred at any stage of the winding and/or unwinding process.

In some examples, the first electrically conductive cable is a flat electrically conductive cable. This may allow for the winch to be made more compact as the diameter of the flat electrically conductive cable is much less than that of a round electrically conductive cable. The flat electrically conductive cable may also produce less electrical noise than a round cable.

In some examples, the fixation unit comprises an elastic material, preferably spring steel. The fixation unit may comprise an elastic material which can be placed over the end of a third support member, should there be one, and then contract into place over the support member, allowing for easy addition of said fixation unit to the third support member. The spring steel may ensure that the unit is particularly strong and resistant to wear, as spring steel has relatively high yield strength, resistance to deformation and elastic qualities.

In some examples, the winch comprises a said winch drum. This drum may allow the load at one end of the second electrically conductive cable to travel in a direction (substantially) equal to the direction of gravity.

In some examples, the flat electrically conductive cable has a thickness between (and including) 0.1 mm and 0.2 mm. This may allow the winch to be easily compatible with industry standard flat electrically conductive cables, which may make the maintenance of the winch easier.

In some examples, the frame portion which comprises a connector is comprised of PCB. This may allow for a control unit to be coupled to the frame portion and allow a more stable transfer of signals from the control unit to the first electrically conductive cable. This connector may be different to the connector which may be configured to couple the first electrically conductive cable to a second electrically conductive cable.

In some examples, the drum comprises a series of grooves. The number of grooves may be equal to the number of coils of the second electrically conductive cable which is wound around the drum. These grooves may guide the second electrically conductive cable back onto the drum during the winding and/or unwinding process.

In some examples, the number, a, of windings of the first electrically conductive cable is equal to the number, b, of coils of the second electrically conductive cable wound around the drum plus three additional windings (i.e. a=b+3). This may allow for contingency should the motor rotating the drum over rotate.

Example implementations using the flat spiral cable solution as described herein may be particularly advantageous for lighting winch applications.

These and other aspects of the invention will now be further described, by way of example only, with reference to the accompanying figures, wherein like reference numerals refer to like parts.

DETAILED DESCRIPTION OF THE INVENTION

In the examples described herein, the winch is orientated such that the load is lowered in a substantially downward axial direction.

Figure 1:
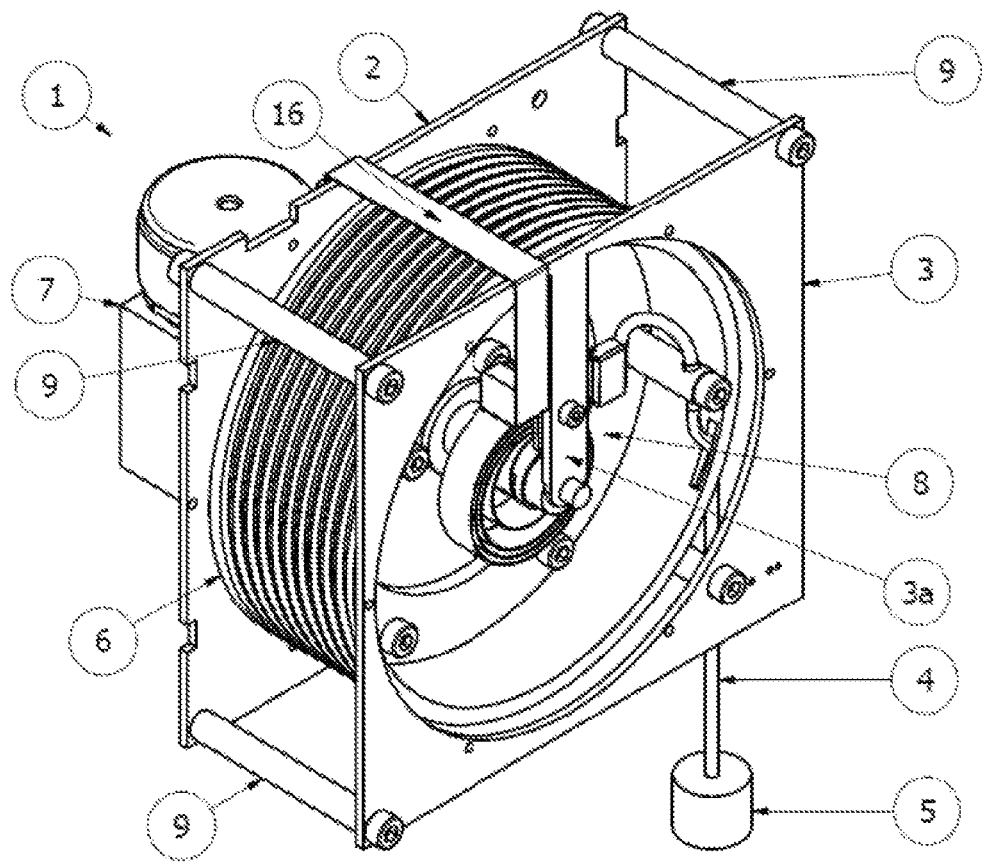
FIGS. 1 and 1a show perspective views of a schematic illustration of a winch according to some example implementations as described herein.

FIG. 1 shows a perspective view of a schematic illustration of a winch 1 according to some example implementations as described herein.

In this example, the winch 1 comprises two frame portions 2, 3 coupled via a series of members 9. These members can be nuts and bolts, and/or screws, and/or any other type for fixing these two portions 2, 3 at a set distance. The distance between the frame portions 2, 3 is, in this example, the axial length of the drum 6, which is placed in between the frame portions 2, 3.

The frame portion 3 has a support portion 3a, the purpose of which will be described in more detail below.

Attached to a second electrically conductive cable 4 is a load 5 located at the free end of the second electrically conductive cable 4. Additionally, the second electrically conductive cable 4 is coiled around the drum 6.

The drum 6 is rotated about the axis of rotation of the drum 6 by the motor 7. Located inside the drum is the spiral cable unit 8.

The frame portions 2, 3 may be of any shape that ensures that the drum 6 is not allowed to travel outside the frame portions 2, 3.

In this example, the drum 6 comprises a series of grooves on the outer face to guide the second electrically conductive cable 4 during the winding and/or unwinding processes to ensure that the second electrically conductive cable 4 does not become tangled during the process(es). Each groove may contain only one coil of the second electrically conductive cable 4. Alternatively, each groove main contain a plurality of coils of the second electrically conductive cable 4.

The winch 1 in this example is always positioned in such a way that the second electrically conductive cable 4 and the load 5 upon it are substantially equal to the direction of gravity during the rotation of the drum 6.

Figure 1A:
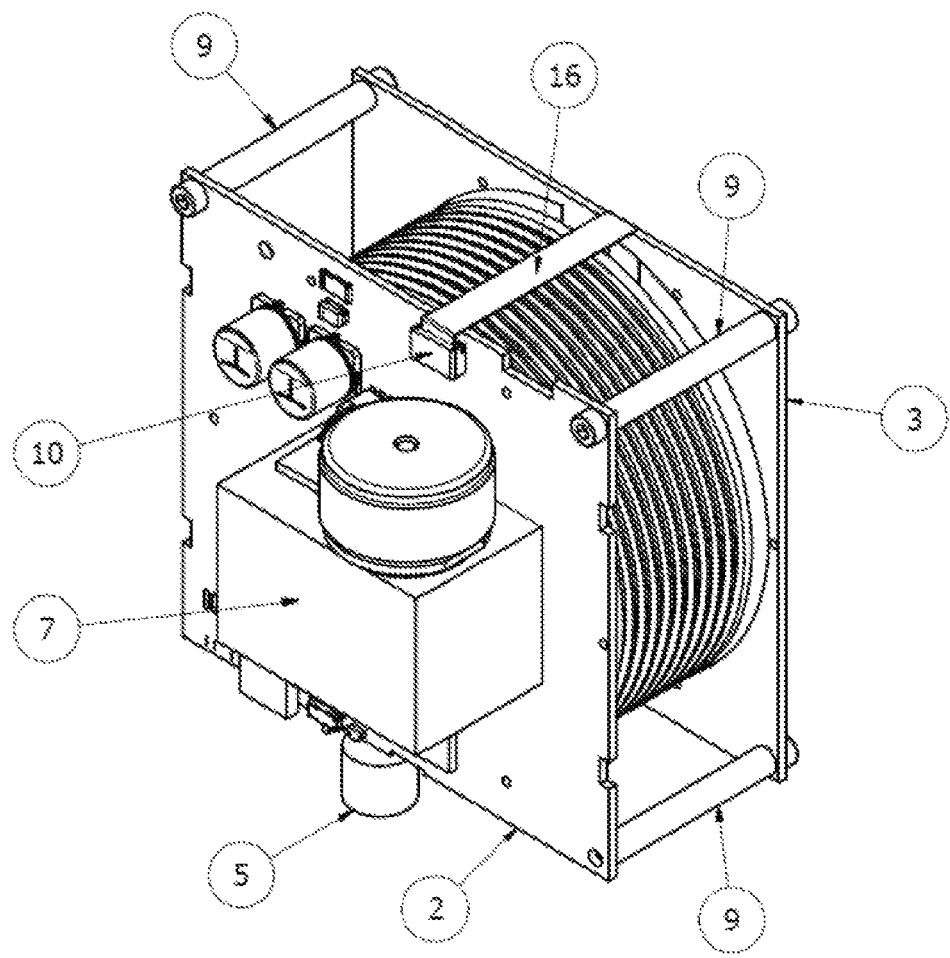

FIG. 1a shows a perspective view of a schematic illustration of the winch 1 according to some example implementations as described herein.

In this example, the first electrically conductive cable 16, which is a flat electrically conductive cable and hereon referred to as a flat electrically conductive cable, is inserted into a first connector 10 located on the frame portion 2 closest to the motor 7. Alternatively, the first connector 10 may be located on the frame portion 3 furthest from the motor 7.

A portion of the flat electrically conductive cable 16 is inserted into the first connector 10. This portion of the cable 16 is fixed in place and cannot travel in an axial direction, a radial direction, a rotational direction or any combination of those directions.

The frame portion 2 to which the first connector 10 is coupled may be made partly or wholly from PCB. Additionally or alternatively, the frame portion 3 to which the first connector 10 is not coupled may be made partly or wholly from PCB.

The flat electrically conductive cable 16 may comprise FPC and/or flexible PCB. This may allow for electrical power and/or electrical data signals to be transferred from the first connector 10, which may be located on a frame portion 2, 3, to the load 5 via the flat electrically conductive cable 16, the spiral cable unit 8 and the second electrically conductive cable 4.

Alternatively or additionally, the first connector 10 located on the frame portion 2 closest to the motor 7 may be a control unit. Additionally or alternatively, the control unit may be placed anywhere upon the frame portion 2 closest to the motor 7 or the frame portion 3 furthest from the motor 7. If the control unit and the motor 7 are on different frame portions 2, 3, the control unit may send signals to the motor 7 wirelessly.

Figure 2:
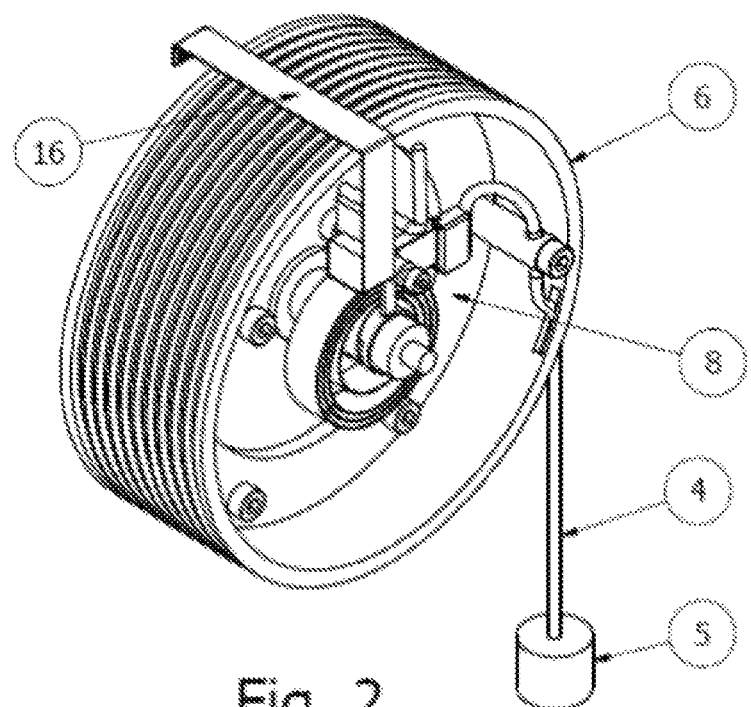
FIG. 2 shows a perspective view of a schematic illustration of a drum and a spiral cable unit according to some example implementations as described herein.

FIG. 2 shows a perspective view of a schematic illustration of a drum 6 and a spiral cable unit 8 according to some example implementations as described herein.

In FIG. 2, the second electrically conductive cable 4 is unwound and the grooves on the drum 6 are visible. It can be seen in FIG. 2 that each groove is of a sufficient axial length to hold one coil of the second electrically conductive cable 4. Alternatively, each groove on the drum may be of a sufficient axial length to hold a plurality of coils of the second electrically conductive cable 4.

Providing a drum 6 with grooves may allow for easy winding and/or unwinding of the rope, the second electrically conductive cable 4 and/or the flat electrically conductive cable 16.

In this example, the second electrically conductive cable 4 is fed through a surface of the drum 6 and is coupled to the spiral cable unit 8. The spiral cable unit 8 is partially coupled to the drum 6. Parts of the spiral cable unit 8 which are shown in FIG. 2 will be described in more detail below.

Figure 3:
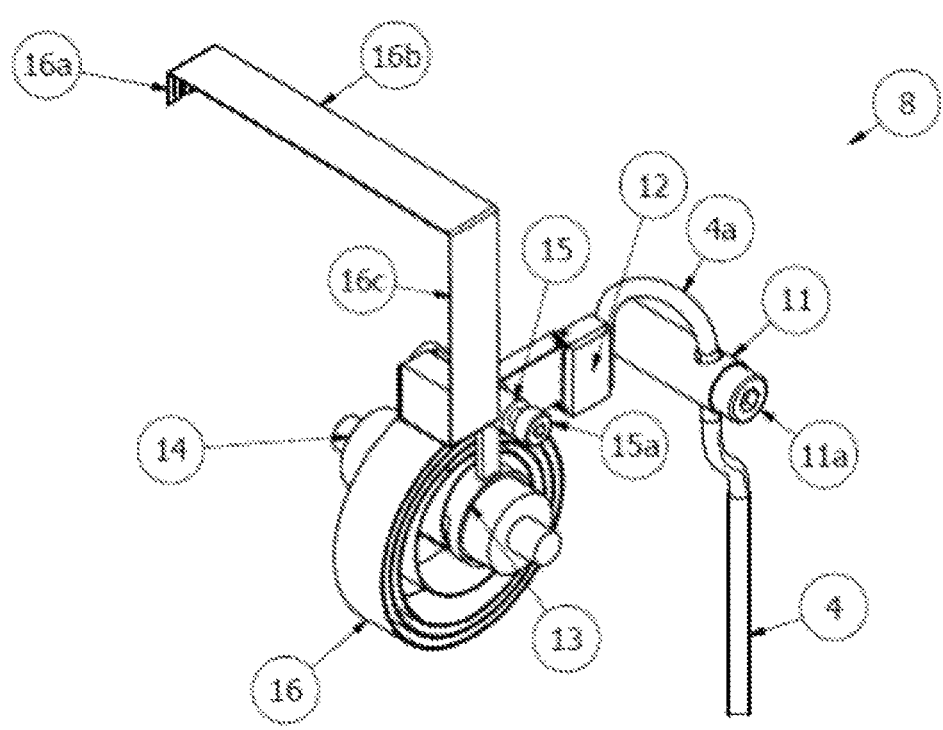
FIG. 3 shows a perspective view of a schematic illustration of a spiral cable unit according to some example implementations as described herein.

FIG. 3 shows a perspective view of a schematic illustration of a spiral cable unit 8 according to some example implementations as described herein.

In this example, the spiral cable unit 8 comprises in particular three parts, a first support member 14, a second support member 15, and a rope support member 11. In this example, the first support member 14 and the rope support member 11 are cylindrical in shape and lie in a substantially axial direction in relation to the axis of rotation of the drum 6.

The first support member 14 and the rope support member 11 may be of any shape that allows the winch 1 to operate. In some examples, the first support member 14 and the rope support member 11 do not lie in a substantially axial direction in relation to the axis of rotation of the drum 6.

In this example, the second electrically conductive cable 4 is passed through the rope support member 11, and is fixed in place by a screw 11a. The rope support member 11 is fixed on the drum 6 so that it can rotate as the drum 6 rotates. A portion 4a of the second electrically conductive cable 4 is directly coupled (i.e. connected, for example soldered) to the second connector 12. The portion 4a of the second electrically conductive cable 4 is coupled to the second connector 12 preferably by solder.

The flat electrically conductive cable 16 receives electrical power and/or electrical data signals from the previously mentioned control unit via the first connector 10, and then transfers the power and/or signals to the second connector 12 via the flat electrically conductive cable 16. The portion 4a of the second electrically conductive cable 4 fixed in the rope support member 11 receives the electrical power and/or electrical data signals from the flat electrically conductive cable 16 via the second connector 12, and transfers these signals to the load 5, so that the load 5 is powered.

Alternatively or additionally, the load 5 can send electrical power and/or electrical data signals to the control unit which may be located on a frame portion 2 and/or 3.

The rope support member 11 also holds the second electrically conductive cable 4 (for example by a screw) to aid the winding and/or unwinding processes.

The first support member 14 has, in this example, the second portion of the flat electrically conductive cable 16 wound around it and a fixation unit 13 located on said support member 14. Alternatively, the fixation unit may be located within the first support member.

Figure 3A:
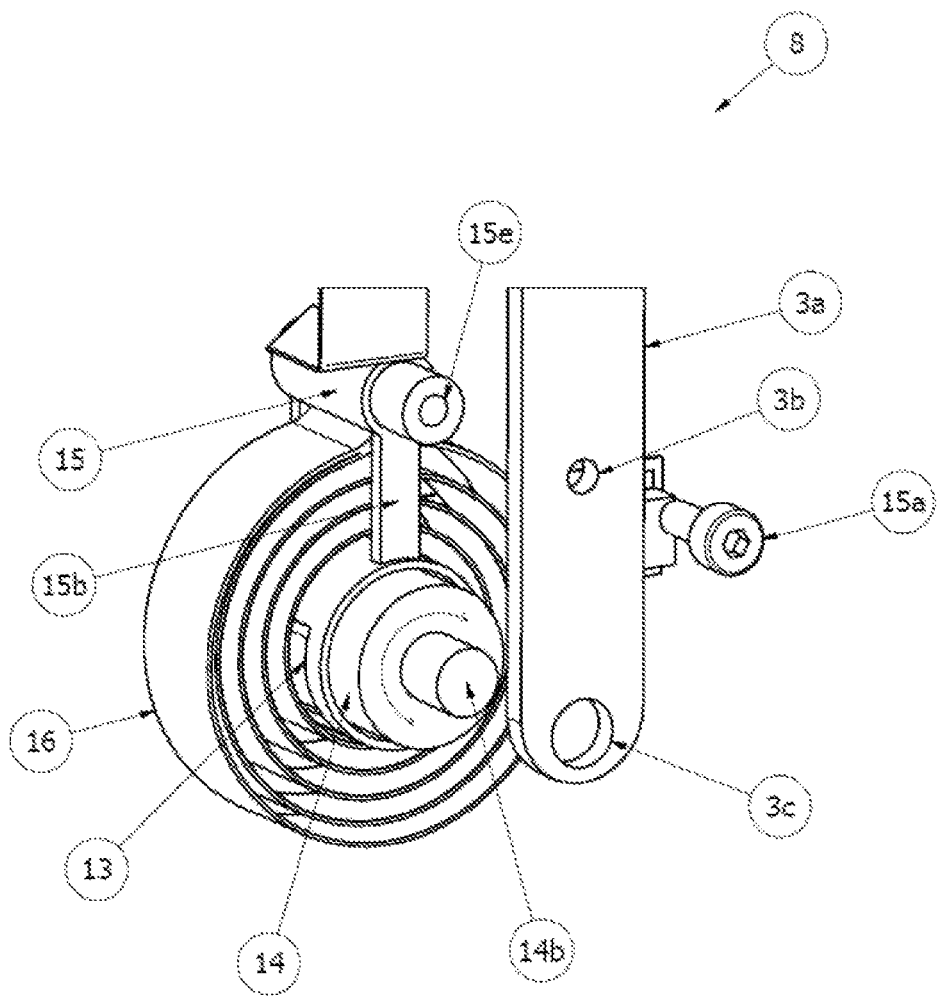
FIG. 3a shows a perspective exploded partial view of a schematic illustration of a spiral cable unit according to some example implementations as described herein.

FIG. 3a shows a perspective exploded partial view of a schematic illustration of a spiral cable unit 8 according to some example implementations as described herein.

In this example, a support portion 3a of a support frame 3 is shown. The positioning of the support portion 3a is substantially equal to the direction of gravity. Alternatively, the support portion 3a may be orientated in any way which allows for operation of the winch 1.

The support portion 3a comprises a first hole 3b, which is used to fix the second support member 15 to the support frame 3 by mounting a screw 15a, and a second hole 3c, which accommodates a support pin 14b of first support member 14. This results in the support pin 14b being freely rotatable inside the second hole 3c.

Additionally or alternatively, one or more ball bearing are placed inside the second hole 3c which may aid friction reduction and improve winch efficiency.

The positioning of the support portion 3a and the holes 3b, 3c allows for the second support member 15 to be located substantially above the first support member 14. In this example, the support members 14, 15 are substantially perpendicular to the direction of gravity and parallel with the ground and the axis of rotation of the winch drum 6.

Alternatively, the support members 14, 15 may be placed in any location and in any orientation that allows for operation of the winch 1.

The first support member 14 has a common axial axis with the drum 6. The first support member 14 is coupled to the drum 6 so that when the drum 6 rotates, the first support member 14, the rope support member 11, the portion 4a of the second electrically conductive cable 4 fixed to the rope support member 11 and the second connector 12 rotate together. This rotation leads to the winding and/or unwinding of the second portion of the flat electrically conductive cable 16 as the second electrically conductive cable 4 unwinds and/or winds.

Figure 3B:
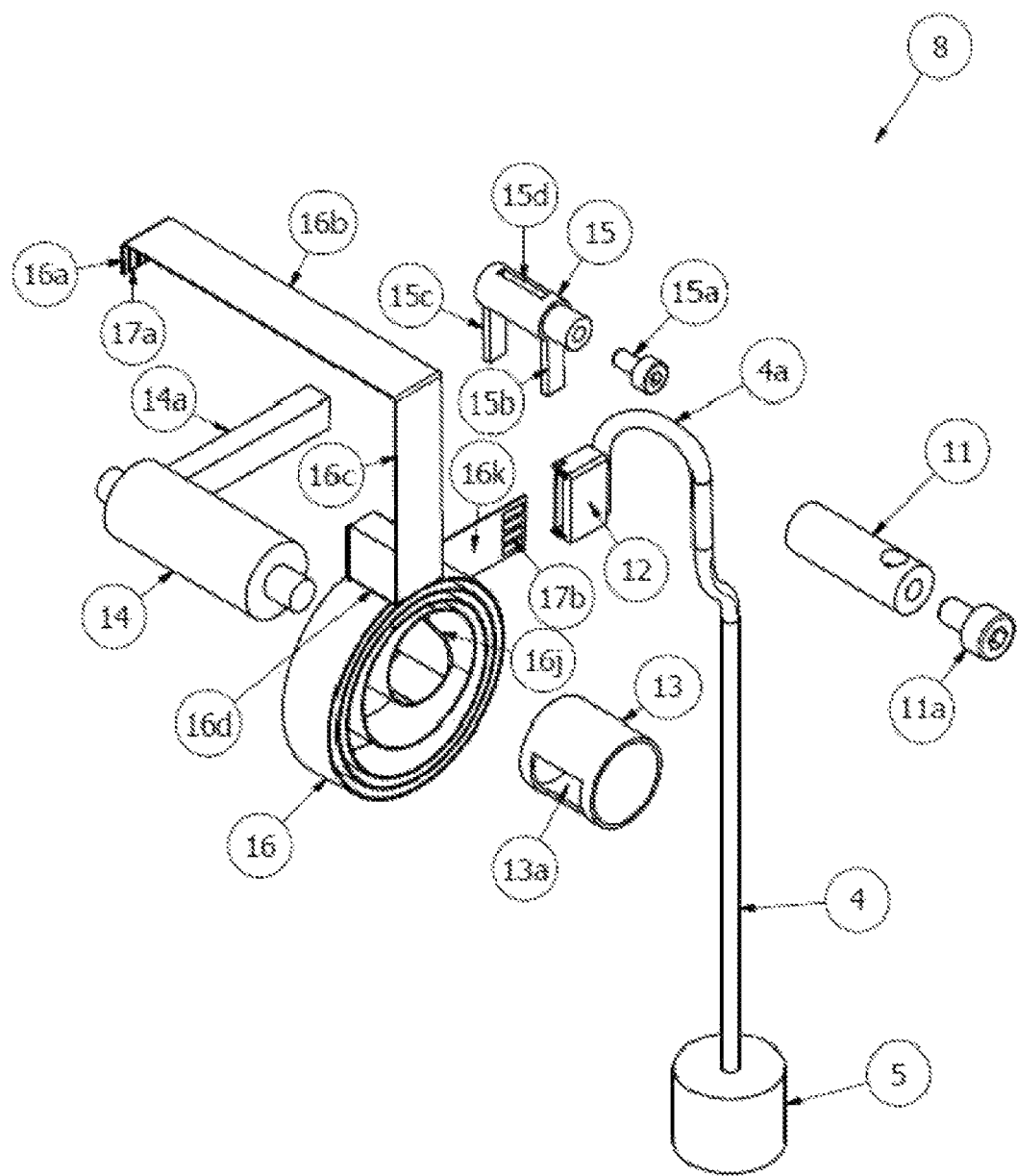
FIG. 3b shows a perspective exploded view of a schematic illustration of a spiral cable unit according to some example implementations as described herein.

FIG. 3b shows a perspective exploded view of a schematic illustration of a spiral cable unit 8 according to some example implementations as described herein.

The second support member 15 has a pair of limiting members 15b and 15c which extend in a radial direction towards the fixation unit 13. The purpose of limiting members 15b and 15c is to restrict the axial movement of the windings of the second portion of the flat electrically conductive cable 16 during the winding and/or unwinding processes.

The axial gap between the limiting members 15b, 15c and an edge of the flat electrically conductive cable 16 is preferably less than ½ and more than ¼ of the flat electrically conductive cable 16 axial width. That is to say, the overall axial gap is between 1.5 and 2 times the axial width of the flat electrically conductive cable 16. Alternatively, the gap may be outside of this range.

In this example, a screw 15a is used to fix the second support member 15 to the frame support portion 3a. A slot 15d in the second support member 15 holds a portion of the flat electrically conductive cable 16. In this example, the slot 15d is in a substantially axial orientation. This portion of the flat electrically conductive cable 16 may be fixed in the slot 15d by means of glue or any other suitable means. The slot 15d may be of any other orientation.

In this example, the axial width of the slot 15d is equal to the axial width of the flat electrically conductive cable 16. This may prevent excess axial movement of the flat electrically conductive cable 16 and increase axial stability of the windings of the flat electrically conductive cable 16.

The first support member 14 comprises, in this example, a support 14a in a substantially radial direction, which holds the second connector 12. In some examples, the second connector 12 is fixed to the support 14a by means of, for example, a glue. In some examples, there is no support 14a.

A 90 degree folded portion 16j of the flat electrically conductive cable 16 is placed over first support member 14. Then, the fixation unit 13 is placed over the 90-degree folded portion 16j of the flat electrically conductive cable 16. Thus, the folded portion 16j of the flat electrically conductive cable 16 is secured between the first support member 14 and the fixation unit 13. In some examples, this fixing is permanent. In some examples, there are one or more windings of the flat electrically conductive cable 16 secured between the first support member 14 and the fixation unit 13.

A part of the flat electrically conductive cable 16 is then fed through a substantially axial opening 13a of the fixation unit 13 so that the flat electrically conductive cable 16 can be wound and/or unwound around the fixation unit 13. A portion 16k of the flat electrically conductive cable 16 is then directly coupled (connected) to the second connector 12.

In this example, the axial width of the opening 13a of the fixation unit 13 is substantially equal to the axial width of the flat electrically conductive cable 16. This may allow for the flat electrically conductive cable 16 to be stable in the axial direction and prevent unwanted axial displacements of the windings of the flat cable 16 while the flat cable 16 is stationary and/or when the flat cable 16 is undergoing the winding/unwinding process.

This may be important not only, but especially in a fully unwound state of the flat electrically conductive cable. Edges of flat cable 16 may thus be mechanically supported by the sides of the fixation unit opening 13a. If they were not, the flat cable may be displaced axially to some extent and create even more displacements when unwound.

In this example, the portion 16a of the flat electrically conductive cable 16 coupled to the first connector 10 and the portion 16k of the flat electrically conductive cable 16 coupled to the second connector 12 comprise electronic contact pads 17a, 17b. These pads 17a, 17b allow for easier transfer of the electrical power and/or electrical data signals from each connector 10, 12 to and/or from the flat electrically conductive cable 16. These pads 17a, 17b, and their respective connectors 10, 12 may be shaped such that they mate with each other in order to allow for a more secure fastening.

Figure 4A:
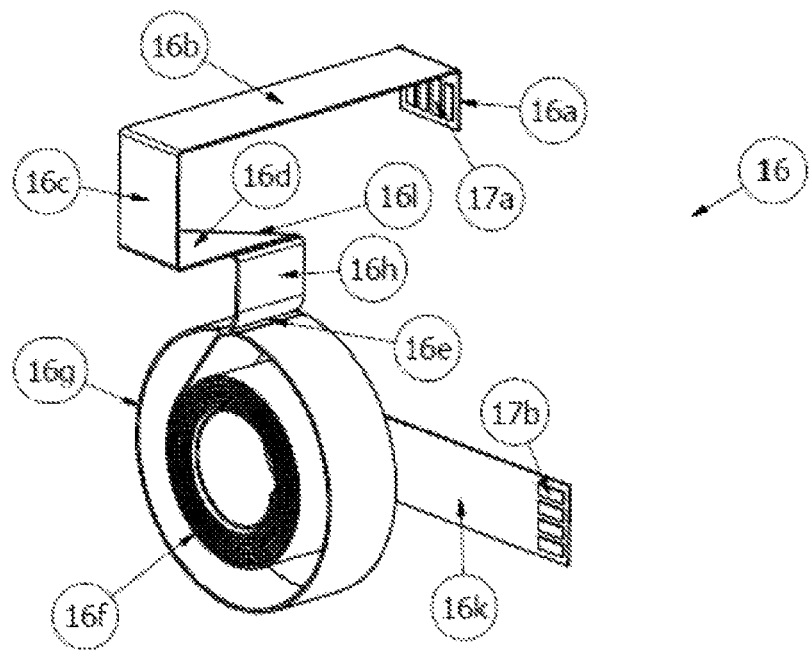
FIGS. 4a and 4b show perspective views of the flat electrically conductive cable in a completely wound state.
Figure 4B:
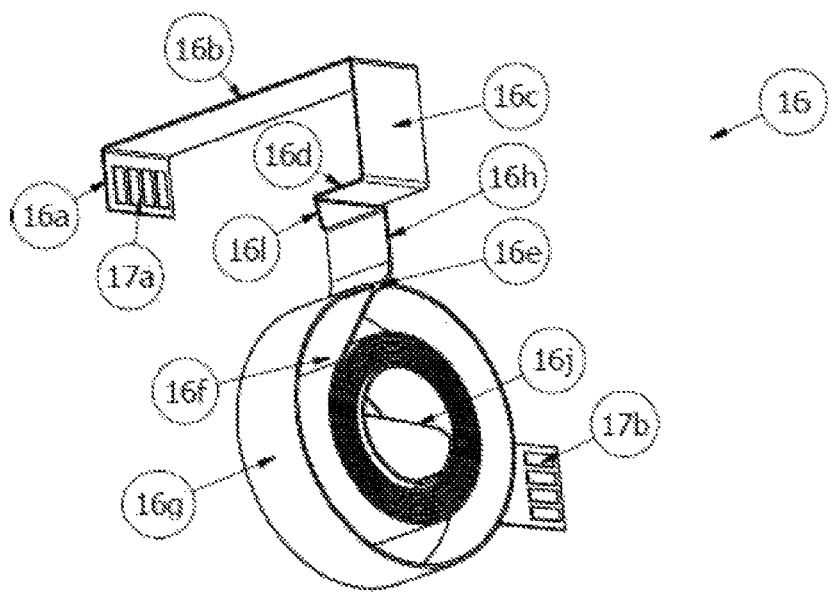

FIGS. 4a and 4b show perspective views of the flat electrically conductive cable 16 in completely wound state.

In a preferred example, when the flat electrically conductive cable 16 is in completely wound state, the second electrically conductive cable 4 is also in a completely wound state. In some examples, when the flat electrically conductive cable 16 is in completely wound state, the second electrically conductive cable 4 is in a completely unwound state. Alternatively, when the flat electrically conductive cable 16 is in completely unwound state, the second electrically conductive cable 4 is in a completely wound state.

A portion 16h of the flat electrically conductive cable 16 is placed and fixed inside the slot 15d of the second support member 15.

A folded portion 16I and unfolded portions 16d, 16c, 16b and 16a of the flat electrically conductive cable 16 are configured to allow the flat electrically conductive cable 16 to be connected to the first connector 10. This may be done in any manner that does not impede the operation of the winch 1 and the portions are not restricted to the shape and orientation of those shown in FIGS. 4a and 4b.

Portion 16g and portion 16f of the flat electrically conductive cable 16 are glued together at point 16e to form a circular limiting element. This may protect the flat electrically conductive cable 16 from excess radial expansion during the unwinding process. It can also act as an additional mechanical support for the flat electrically conductive cable 16, and also increase axial stability of the flat electrically conductive cable 16. The limiting element may be of any other shape which protects the flat electrically conductive cable 16 from excess radial expansion during the unwinding process.

The circular limiting element may be formed by gluing a single winding of the flat electrically conductive cable 16 to itself or, alternatively, by gluing/fixing together two or more windings of the flat electrically conductive cable 16. The portions 16f, 16g of the flat electrically conductive cable may be fixed together by any other suitable means.

It can also be seen from FIG. 4b how the folded portion 16j of the flat electrically conductive cable 16 is fixed between first support member 14 and fixation unit 13.

In this example, portions 16g, h, d, c, b, and a of the flat electrically conductive cable 16 are fixed in place and non-rotatable, and portions 16f, j and k of the flat electrically conductive cable 16 are rotatable together with the drum 6.

Figure 5A:
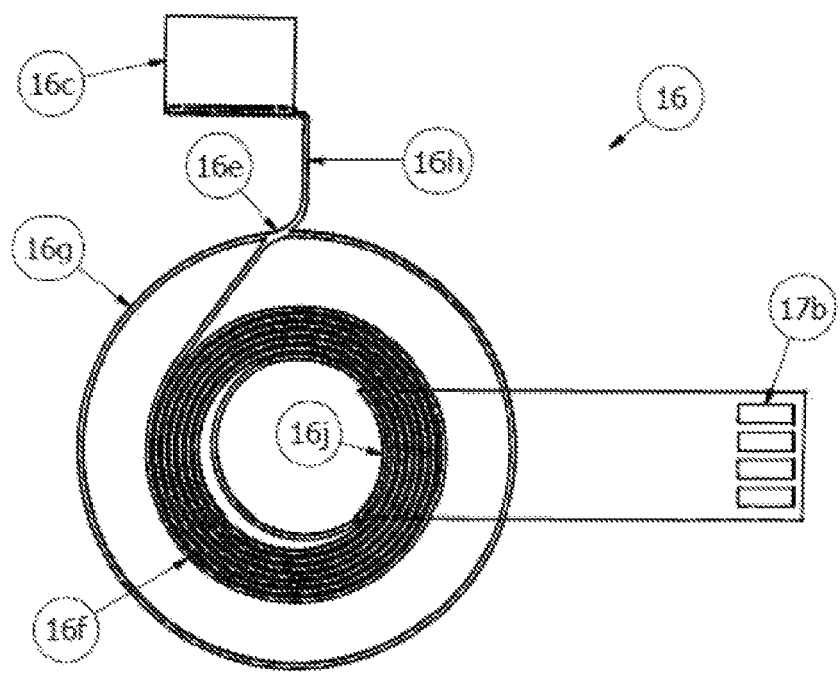
FIGS. 5a and 5b show cross-sectional side views of a schematic illustration of the flat electrically conductive cable in a completely wound state according to some example implementations as described herein.
Figure 5B:
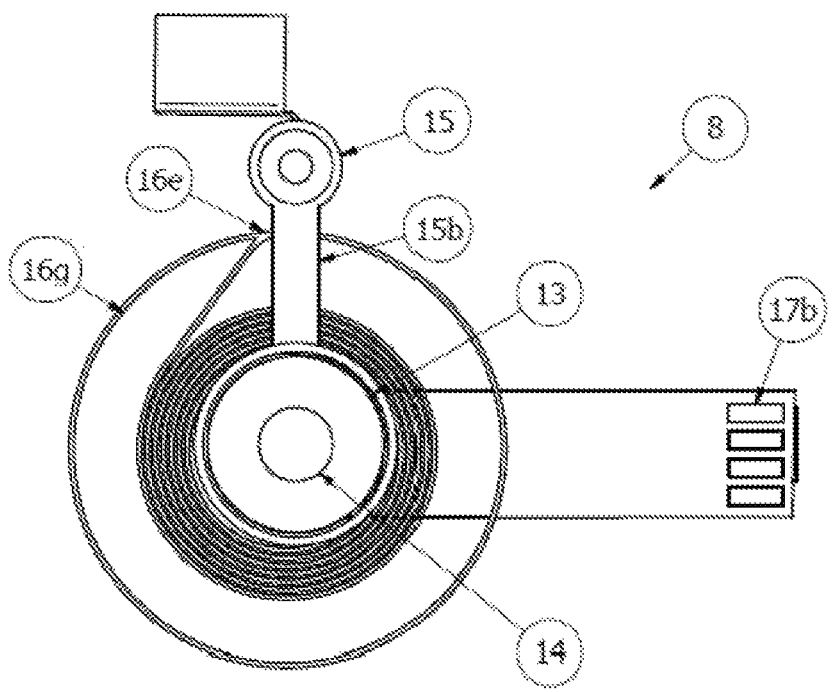

FIGS. 5a and 5b show cross-sectional side views of a schematic illustration of the spiral cable unit 8 and the flat electrically conductive cable 16 in a completely wound state according to some example implementations as described herein.

As the flat electrically conductive cable 16 is wound, the windings of flat electrically conductive cable 16 are compressed radially towards the fixation unit 13. In a completely wound state, the windings surround the fixation unit 13 and are in contact with the fixation unit 13. In some examples, there are excess windings and when the flat electrically conductive cable 16 is in a completely wound state, there is slack in the flat electrically conductive cable 16. This may allow for the prevention of overwinding of the flat electrically conductive cable 16, which may in turn lead to a mechanical failure of the motor 7.

It can be seen in FIGS. 5a and 5b that the connection point 16e of the circular limiting element is near to the second support element 15. Alternatively, this connection point 16e can be at any point on the circular limiting element.

Figure 6A:
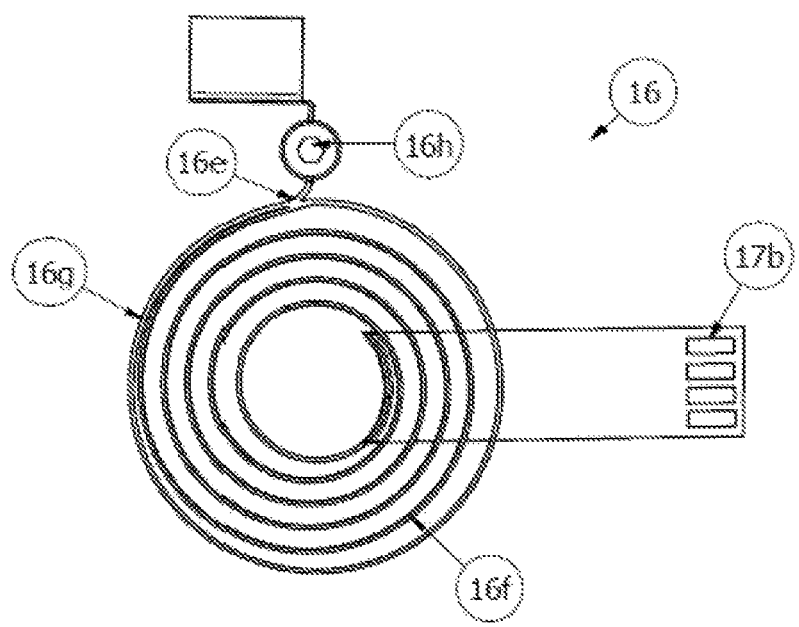
FIGS. 6a and 6b show cross-sectional side views of a schematic illustration of a flat electrically conductive cable in a semi-unwound state according to some example implementations as described herein.
Figure 6B:
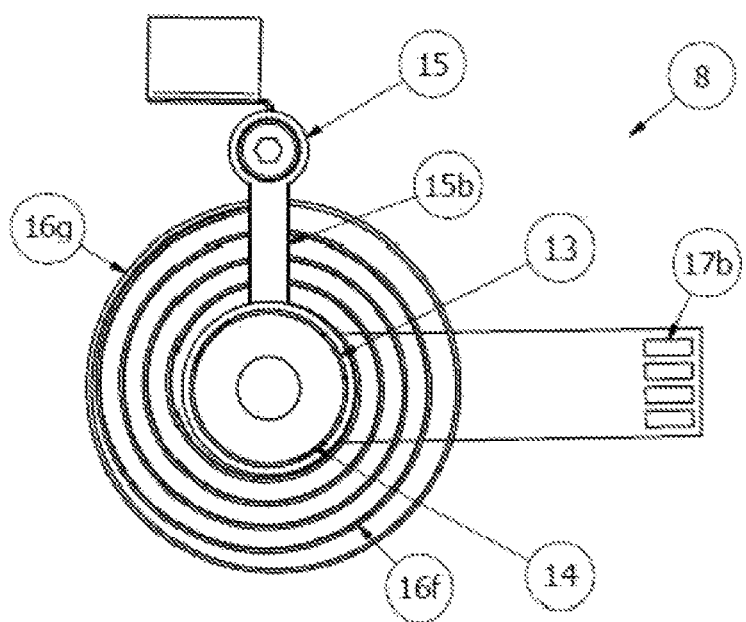

FIGS. 6a and 6b show cross-sectional side views of a schematic illustration of the spiral cable unit 8 and the flat electrically conductive cable 16 in a semi-unwound state according to some example implementations as described herein.

As the flat electrically conductive cable 16 is unwound, the windings of flat electrically conductive cable 16 expand radially towards the circular limiting element. In a completely unwound state, the windings are in contact with the circular limiting element. Alternatively, the windings may not be in contact with the circular limiting element.

As can be seen in FIGS. 6a and 6b, the second support member 15 may or may not comprise limiting members 15b, 15c.

Figure 7A:
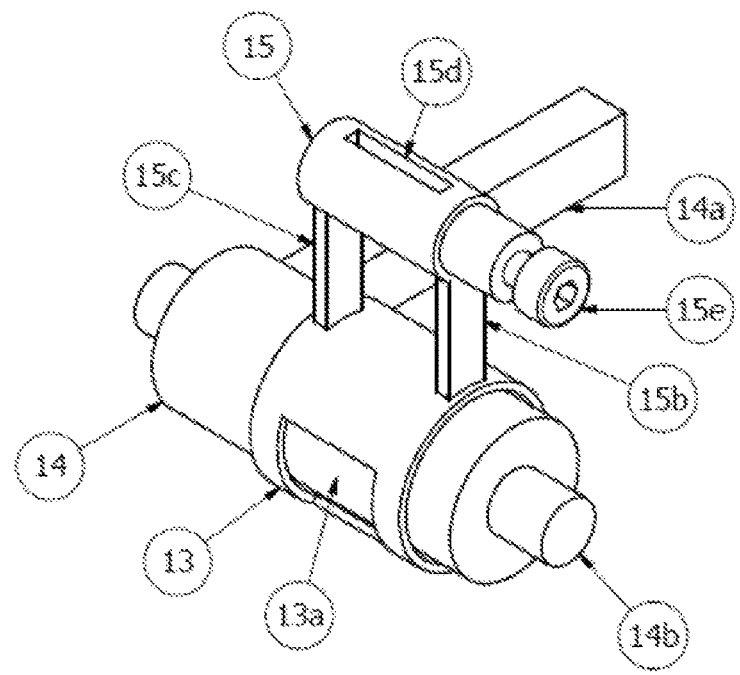
FIG. 7a shows a perspective view of a schematic illustration of the assembly (without the cable) of the second support member, the fixation unit and the first support member according to some example implementations as described herein.

FIG. 7a shows a perspective view of a schematic illustration of the assembly (without the cable 16) of the secondary support member 15, the fixation unit 13 and the first support member 14 according to some example implementations as described herein.

Figure 7B:
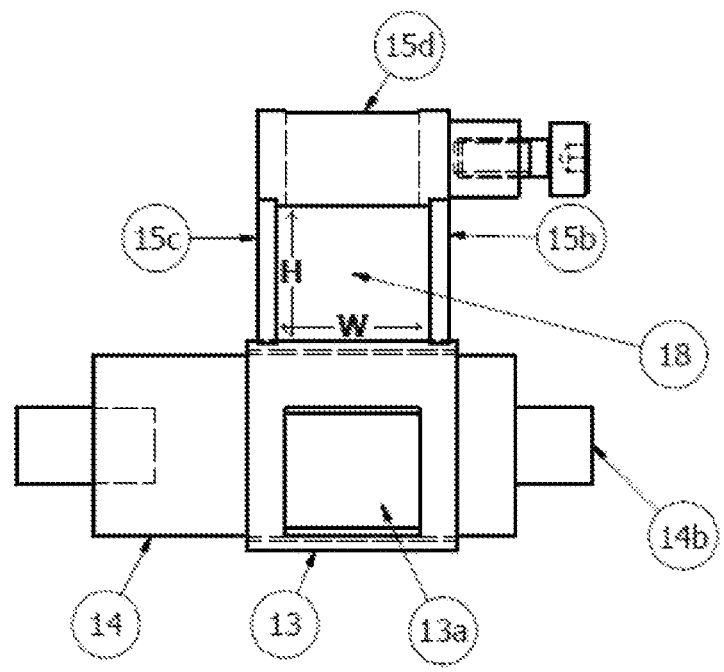
FIG. 7b shows a front view of a schematic illustration of the assembly (without the cable) of the second support member, the fixation unit and the first support member according to some example implementations as described herein.

FIG. 7b shows a front view of a schematic illustration of the assembly (without the cable 16) of the secondary support member 15, the fixation unit 13 and the first support member 14.

In this example, the limiting members 15b, 15c of the second support member 15 touch the surface of fixation unit 13 and slide over the fixation unit 13 during the rotation of the drum 6, as is shown in FIG. 7a. In some examples, the limiting members 15b, 15c of the second support member 15 do not touch the fixation unit 13.

In this example, the fixation unit 13 and the first support member 14 are directly coupled (connected) and fixed together. In some examples, the fixation unit 13 and the first support member 14 are not directly coupled and/or not fixed together. In some examples, the first support member 14 is fixed to drum 6.

The limiting members 15b, 15c of the secondary support member 15, together with the fixation unit 13, form a space 18, with radial height H and axial width W, as is shown in FIG. 7b.

The radial height H of the space 18 is enough to accommodate the windings of the flat electrically conductive cable 16 in a wound state and the circular limiting element. The radial height H of the space 18 is also enough to accommodate an additional gap which is at least equal to "the number of windings"×"the thickness of a winding of the flat electrically conductive cable 16"×2.

The axial width W of the space 18 between limiting members 15b, 15c is between 1.5 and 2 times the axial width of the flat electrically conductive cable 16. This may allow for unnecessary contacts between the flat electrically conductive cable 16 and the limiting members 15b, 15c to be avoided, thus, reducing noise pollution. Alternatively, the axial width W of the space 18 may be outside of this range.

In this example, the slot 15d of the second support member 15 and the opening 13a of the fixation unit 13 are in parallel with an axial direction along the axis of rotation of the winch drum 6. This may prevent the flat electrically conductive cable 16 from moving in the axial direction during the winding and/or unwinding processes and thus, improve axial stability of the cable 16. It may also prevent the cable 16 from undergoing unwanted angular changes of direction during the winding and/or unwinding processes. In some examples, the slot 15d of the second support member 15 and the opening 13a of the fixation unit 13 are substantially in parallel with an axial direction along the axis of rotation of the winch drum 6.

In this example, the second support member 15 is located above the first support member 14 at a distance of approximately ½ of the diameter of the circular limiting element. Alternatively, the distance between the support members 14, 15 may be more or less than ½ of the diameter of the circular limiting element.

Figure 8A:
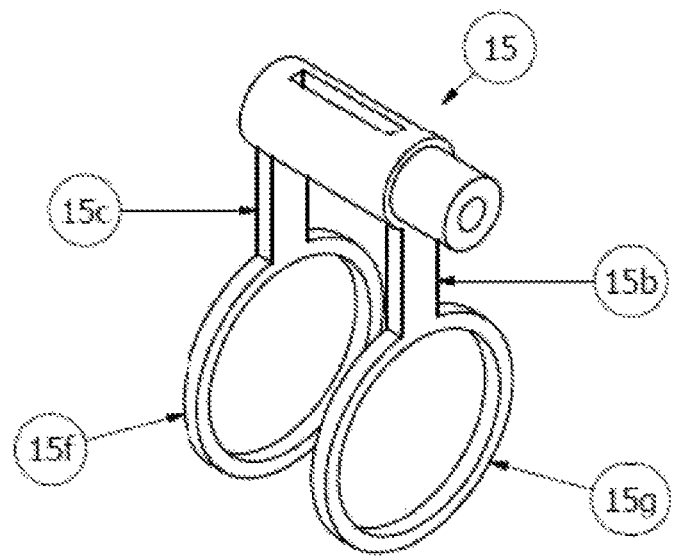
FIGS. 8a and 8b show perspective views of a schematic illustration of a modified second support member, the fixation unit and the first support member according to some example implementations as described herein.
Figure 8B:
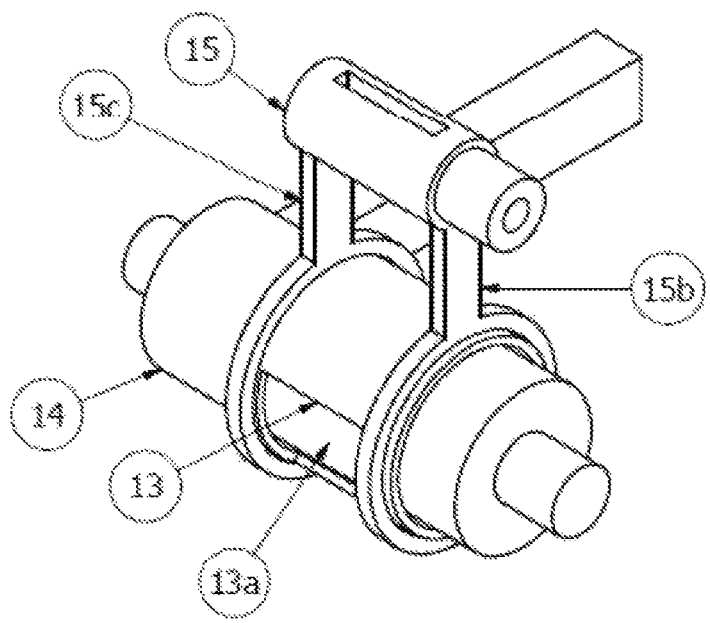

FIGS. 8a and 8b show perspective views of a schematic illustration of a modified secondary support member 15, the fixation unit 13 and the first support member 14 according to some example implementations as described herein.

In this example, the limiting members 15b, 15c of the second support member 15 have additional circular members 15g and 15f, which are configured to hold the first support member 14. They may prevent the windings of the flat electrically conductive cable 16 from being caught between the limiting members 15b and 15c and the surface of fixation unit 13 during the winding and/or unwinding processes. Additionally, this may allow for an easy to assemble spiral cable unit 8.

No doubt many other effective alternatives will occur to the skilled person. It will be understood that the invention is not limited to the described embodiments and encompasses modifications apparent to those skilled in the art and lying within the scope of the claims appended hereto.

What is claimed is:

1. A winch comprising:
   a first electrically conductive cable for transferring electrical power and/or electrical data signals, wherein the first electrically conductive cable is in the form of a spiral;
   a fixation unit coupled to a first portion of the first electrically conductive cable and configured to fix in place the first portion of the first electrically conductive cable; and
   a first support member coupled to a second portion of the first electrically conductive cable, wherein the first portion and the second portion of the first electrically conductive cable are different from each other,
   wherein the first support member is coupleable to a winch drum and is rotatable, together with the second portion of the first electrically conductive cable, with said winch drum in a rotational direction around an axis of rotation of the winch drum while the first portion of the first electrically conductive cable is fixed in place during said rotation,
   wherein the winch further comprises a second support member coupled via the first electrically conductive cable to the fixation unit, wherein the second support member further comprises a slot, wherein the second portion of the first electrically conductive cable is fixed in place in the slot.

2. The winch as claimed in claim 1, wherein the second portion of the first electrically conductive cable comprises or forms a limiting element configured to limit movement of the second portion of the first electrically conductive cable in a radial direction around the axis of rotation of the winch drum.

3. The winch as claimed in claim 1, wherein the fixation unit comprises a fixation unit opening, wherein the fixation unit opening is configured to allow the first electrically conductive cable to be fed through said fixation unit opening.

4. The winch as claimed in claim 1, wherein the second support member further comprises a limiting member extending in a substantially radial direction towards the fixation unit, wherein the limiting member is configured to limit movement of the second portion of the first electrically conductive cable in an axial direction along the axis of rotation of the winch drum.

5. The winch as claimed in claim 4, wherein the limiting member further comprises a limiting member opening configured to accommodate the fixation unit.

6. The winch as claimed in claim 4, wherein the second portion of the first electrically conductive cable comprises or forms a limiting element configured to limit movement of the second portion of the first electrically conductive cable in a radial direction around the axis of rotation of the winch drum, wherein the second support member comprises two limiting members, and wherein an axial gap, W, between the two limiting members fulfills W>1.Sc, where c is an axial thickness of the second portion of the first electrically conductive cable.

7. The winch as claimed in claim 6, wherein the axial gap, W, between the two limiting members additionally fulfills 2c>W.

8. The winch as claimed in claim 1, wherein the fixation unit comprises a fixation unit opening, wherein the fixation unit opening is configured to allow the first electrically conductive cable to be fed through said fixation unit opening, wherein the axial width of the fixation unit opening, the axial width of the second support member slot and an axial thickness of the second portion of the first electrically conductive cable are identical or substantially equal.

9. The winch as claimed in claim 1, wherein the fixation unit comprises a fixation unit opening, wherein the fixation unit opening is configured to allow the first electrically conductive cable to be fed through said fixation unit opening, wherein the fixation unit opening and the second support member slot are in parallel or substantially in parallel with an axial direction along the axis of rotation of the winch drum.

10. The winch as claimed in claim 1, further comprising a connector coupled to the second portion of the first electrically conductive cable and configured to couple the first electrically conductive cable to a second electrically conductive cable, wherein said second electrically conductive cable is configured to transfer electrical power and/or electrical data signals to a load coupleable to the second electrically conductive cable.

11. The winch as claimed in claim 1, further comprising a third support member coupled to the fixation unit and configured such that the first portion of the first electrically conductive cable is secured between the third support member and the fixation unit.

12. The winch as claimed in claim 11, further comprising a second support member coupled via the first electrically conductive cable to the fixation unit, wherein the second support member, the third support member and an axis of rotation of the winch drum are arranged in parallel or substantially in parallel.

13. The winch as claimed in claim 1, further comprising a support frame configured to accommodate the first electrically conductive cable, the fixation unit and the first support member, wherein the support frame comprises a support frame opening configured to limit movement of a second support member and/or a third support member in an axial direction and a radial direction in relation to the axis of rotation of the winch drum.

\* \* \* \* \*